United States Patent
Ikeda et al.

(10) Patent No.: US 8,724,156 B2
(45) Date of Patent: May 13, 2014

(54) IMAGE FORMING APPARATUS AND INFORMATION PROCESSING APPARATUS

(75) Inventors: Shinho Ikeda, Kanagawa (JP); Yuji Murata, Kanagawa (JP); Masakazu Kawashita, Kanagawa (JP); Hideki Yamasaki, Kanagawa (JP); Tadamasa Sakamaki, Kanagawa (JP); Binhui Liu, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 33 days.

(21) Appl. No.: 13/617,310

(22) Filed: Sep. 14, 2012

(65) Prior Publication Data

US 2013/0235419 A1 Sep. 12, 2013

(30) Foreign Application Priority Data

Mar. 6, 2012 (JP) .................................. 2012-049097

(51) Int. Cl.
*G06F 3/12* (2006.01)

(52) U.S. Cl.
USPC .......................... 358/1.16; 358/1.15; 711/103

(58) Field of Classification Search
CPC .......................... G06F 12/0246; G06F 13/1657
USPC ........................ 358/474, 1.13–1.17
See application file for complete search history.

(56) References Cited

U.S. PATENT DOCUMENTS

| 6,880,075 | B1* | 4/2005 | Fukano et al. ..................... 713/1 |
| 8,493,607 | B2* | 7/2013 | Furukawa ..................... 358/1.16 |
| 2008/0140918 | A1* | 6/2008 | Sutardja ........................ 711/103 |
| 2008/0215802 | A1* | 9/2008 | Chow et al. .................... 711/103 |
| 2013/0229681 | A1* | 9/2013 | Murata et al. ................. 358/1.15 |

FOREIGN PATENT DOCUMENTS

JP        A-2010-211351        9/2010

* cited by examiner

*Primary Examiner* — Dennis Dicker
(74) *Attorney, Agent, or Firm* — Oliff PLC (57) ABSTRACT

An image forming apparatus includes an image forming unit that forms an image and a controller that controls the image forming unit, wherein the controller includes a first execution unit that executes a first program, a first main memory that includes a first non-volatile memory, is connected to the first execution unit, and stores a first start program, a first transmission and reception controller that is connected to the first bus, controls the transmission and reception of data, and includes a volatile memory, a second execution unit that is connected to the first execution unit and executes a second program, a second main memory that includes a second non-volatile memory, is connected to the second execution unit, and stores a second start program, and a second transmission and reception controller that is connected to the second bus, controls the transmission and reception of data, and includes a third non-volatile memory.

20 Claims, 11 Drawing Sheets

IMAGE FORMING APPARATUS AND INFORMATION PROCESSING APPARATUS

CROSS-REFERENCE TO RELATED APPLICATIONS

This application is based on and claims priority under 35 USC 119 from Japanese Patent Application No. 2012-049097 filed Mar. 6, 2012.

BACKGROUND

Technical Field

The present invention relates to an image forming apparatus and an information processing apparatus.

SUMMARY

According to an aspect of the invention, there is provided an image forming apparatus including: an image forming unit that forms an image on a recording material; and a controller that controls the image forming unit, wherein the controller includes: a first execution unit that executes a first program used to control the image forming unit; a first main memory that includes a first non-volatile memory which is readable and writable and is capable of retaining stored information even when no power is supplied, is connected to the first execution unit through a first bus, and stores a first start program to be executed upon the start-up of the first execution unit; a first transmission and reception controller that is connected to the first bus, controls transmission and reception of data between the first execution unit and the first main memory, and includes a volatile memory which stores a first setting condition set to transmit and receive the data; a second execution unit that is connected to the first execution unit through a connection bus and executes a second program which is used to process image data to be output to the image forming unit; a second main memory that includes a second non-volatile memory which is readable and writable and is capable of retaining stored information even when no power is supplied, is connected to the second execution unit through a second bus, and stores a second start program to be executed upon the start-up of the first execution unit; and a second transmission and reception controller that is connected to the second bus, controls transmission and reception of data between the second execution unit and the second main memory, and includes a third non-volatile memory which stores a second setting condition set to transmit and receive the data.

BRIEF DESCRIPTION OF THE DRAWINGS

Exemplary embodiments of the present invention will be described in detail based on the following figures, wherein.

DETAILED DESCRIPTION

Hereinafter, an exemplary embodiment of the invention will be described in detail with reference to the accompanying drawings.

Figure 1:
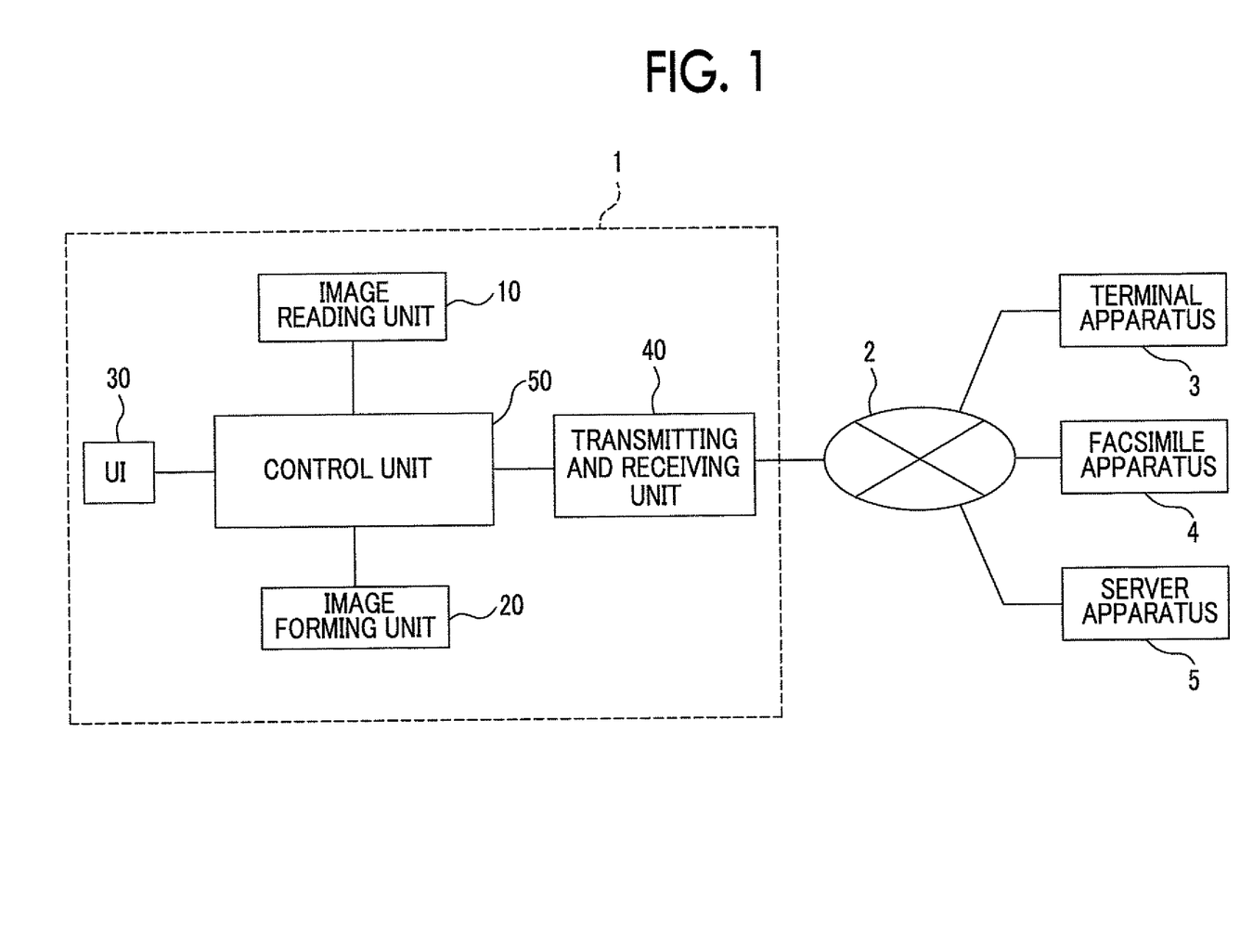
FIG. 1 is a diagram illustrating an example of the structure of an image forming system according to an exemplary embodiment.

FIG. 1 is a diagram illustrating an example of the structure of an image forming system according to this exemplary embodiment.

The image forming system includes an image forming apparatus 1 that operates as a so-called multi-function machine having a scanning function, a print function, a copy function, and a facsimile function, a network 2 connected to the image forming apparatus 1, a terminal apparatus 3 connected to the network 2, a facsimile apparatus 4 connected to the network 2, and a server apparatus 5 connected to the network 2.

The network 2 is, for example, an Internet line or a telephone line. The terminal apparatus 3 instructs the image forming apparatus 1 to perform, for example, an image forming process through the network 2 and is, for example, a Personal Computer (PC). The facsimile apparatus 4 transmits and receives a facsimile to and from the image forming apparatus 1 through the network 2. The server apparatus 5 transmits and receives data (including a program) to and from the image forming apparatus 1 through the network 2.

In addition, the image forming apparatus 1 includes an image reading unit 10 that reads an image recorded on a recording medium, such as paper, an image forming unit 20 that forms an image on a recording medium, such as paper, a user interface (UI) 30 that receives instructions related to a power on/off operation and operations using a scanning function, a print function, a copy function, and a facsimile function from the user and displays a message to the user, a transmitting and receiving unit 40 that transmits and receives data to and from the terminal apparatus 3, the facsimile apparatus 4, and the server apparatus 5 through the network 2, and a control unit 50 that controls the operations of the image reading unit 10, the image forming unit 20, the UI 30, and the transmitting and receiving unit 40. In the image forming apparatus 1, the scanning function is implemented by the image reading unit 10, the print function is implemented by the image forming unit 20, the copy function is implemented by the image reading unit 10 and the image forming unit 20, and the facsimile function is implemented by the image reading unit 10, the image forming unit 20, and the transmitting and receiving unit 40. For example, the transmitting and receiving units 40 for the Internet line and the telephone line may be separately provided.

Figure 2:
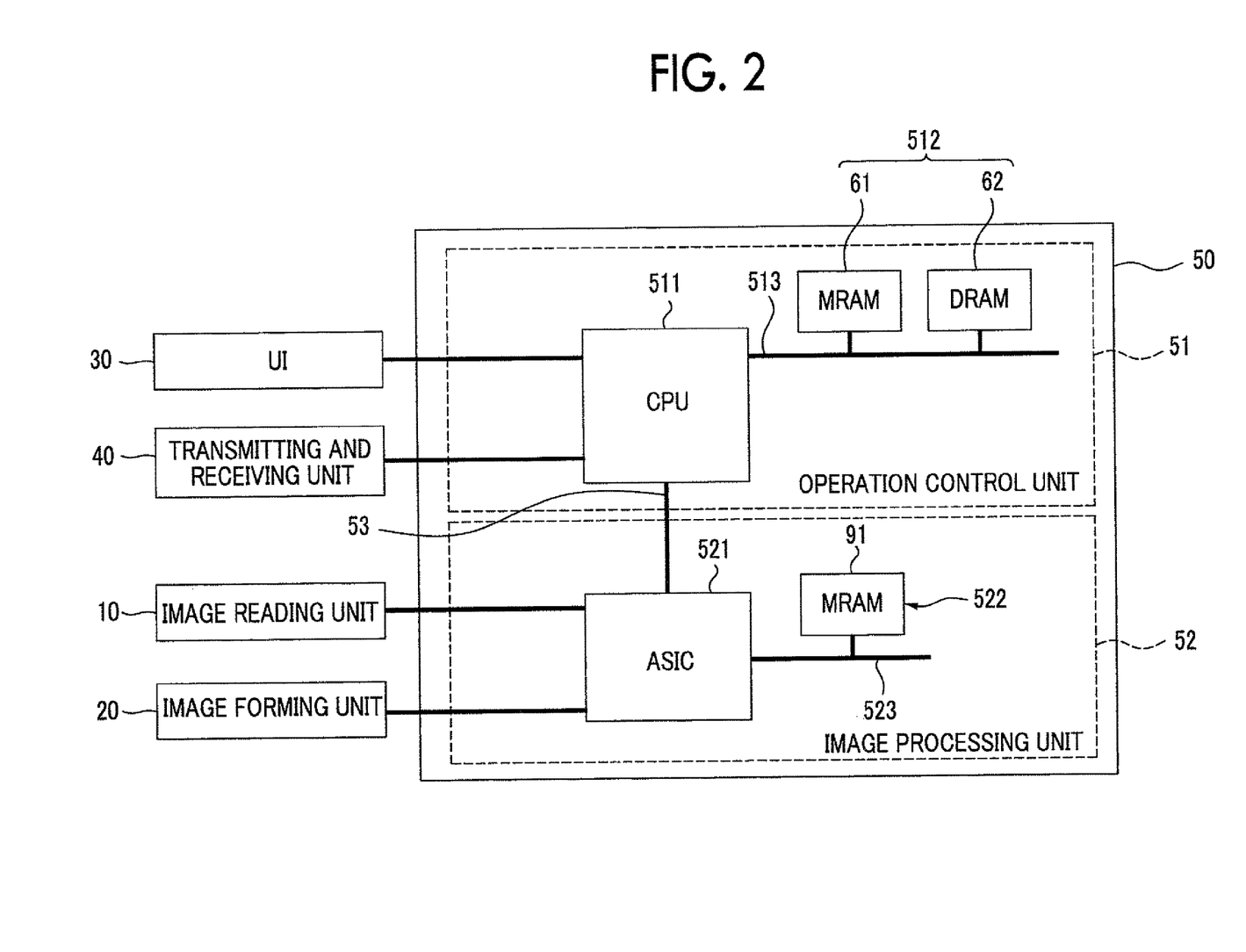
FIG. 2 is a block diagram illustrating an example of the internal structure of a control unit provided in the image forming apparatus.

FIG. 2 is a block diagram illustrating an example of the internal structure of the control unit 50 which is provided in the image forming apparatus 1 shown in FIG. 1.

The control unit 50 according to this exemplary embodiment includes an operation control unit 51 that controls the operation of each unit of the image forming apparatus 1, an image processing unit 52 that performs image processing related to the image reading unit 10 and the image forming unit 20, and a PCI Express (PCIe) bus 53 that connects the operation control unit 51 and the image processing unit 52.

Among them, the operation control unit 51 includes a Central Processing Unit (CPU) 511 that performs various kinds of operations to control each unit of the image forming apparatus 1, and a CPU-MRAM module (MRAM) 61 and a CPU-DRAM module (DRAM) 62 that are connected to the CPU 511 through a CPU-RAM bus 513. In the following description, the CPU-MRAM module 61 and the CPU-DRAM module 62 connected to the CPU 511 are referred to as a main memory 512. The operation control unit 51 is configured such that the CPU 511 directly reads and writes data from and to the main memory 512, which is an example of a first main memory.

The CPU-MRAM module 61 includes a Magnetoresistive RAM (MRAM) as a memory device and functions as a first non-volatile memory that is capable of retaining stored information even when no power is supplied. The CPU-DRAM module 62 includes a Dynamic RAM (DRAM) as a memory device and functions as a first volatile memory that is not capable of retaining stored information when no power is supplied. In this exemplary embodiment, the CPU-MRAM module 61 and the CPU-DRAM module 62 read and write data at a common clock frequency (memory clock) set to the CPU-RAM bus 513. Therefore, the CPU-MRAM module 61 may have the same reading and writing functions as the CPU-DRAM module 62. The CPU-MRAM module 61 reads and writes data at high speed, as compared to a non-volatile memory, such as an Ultra-Violet Erasable Programmable ROM (UV-EPROM), an Electrically Erasable Programmable ROM (EEPROM), or a flash memory. The CPU-DRAM module 62 according to this exemplary embodiment is, for example, a Double-Data-Rate2 Synchronous Dynamic Random Access Memory (DDR2-SDRAM).

The image processing unit 52 includes an Application Specific Integrated Circuit (ASIC) 521 that performs various kinds of calculation to process image data input from the image reading unit 10 and image data to be output to the image forming unit 20 and a main memory 522 that is connected to the ASIC 521 through an ASIC-RAM bus 523. The main memory 522 which is provided in the image processing unit 52 and is an example of a second main memory includes an ASIC-MRAM module (MRAM) 91 that has the same structure as the CPU-MRAM module 61 and is an example of a second non-volatile memory.

The PCIe bus 53 which is an example of a connection bus connecting the operation control unit 51 and the image processing unit 52 performs transmission and reception based on the PCI Express standard to connect the CPU 511 provided in the operation control unit 51 and the ASIC 521 provided in the image processing unit 52 in the control unit 50. In this example, the ASIC 521 performs various kinds of image processing on the basis of instructions received from the CPU 511 through the PCIe bus 53.

Figure 3:
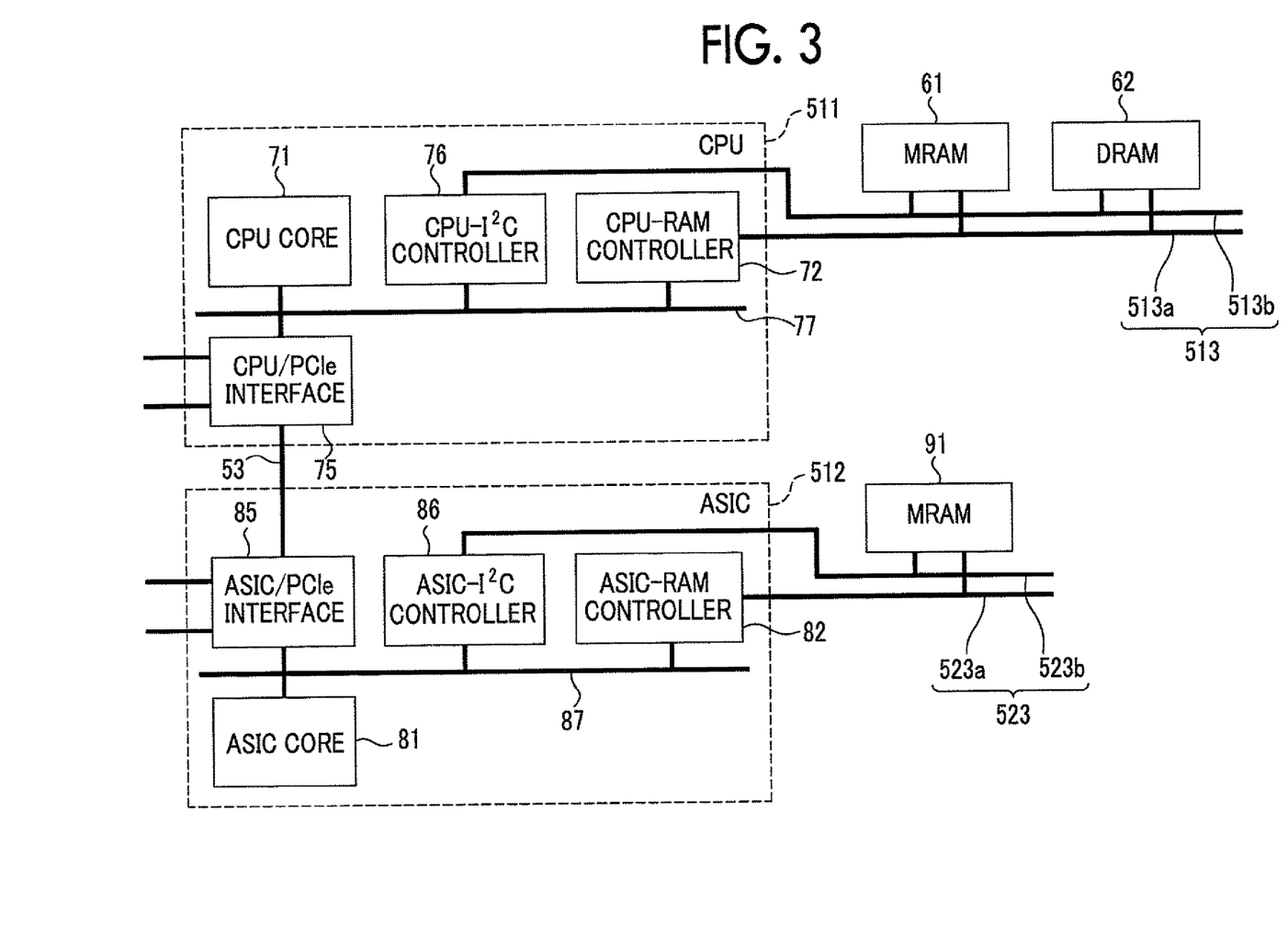
FIG. 3 is a block diagram illustrating an example of the internal structure of a CPU and an ASIC provided in the control unit.

FIG. 3 is a block diagram illustrating an example of the internal structure of the CPU 511 and the ASIC 521 provided in the control unit 50 shown in FIG. 2.

First, the internal structure of the CPU 511 will be described.

The CPU 511 includes a CPU core 71 which is an example of a first execution unit performing various kinds of calculation on the basis of a program and a CPU-RAM controller 72 that controls the transmission and reception of data between the CPU core 71 and the main memory 512 (the CPU-MRAM module 61 and the CPU-DRAM module 62). In addition, the CPU 511 includes a CPU/PCIe interface 75 that controls the transmission and reception of data between the CPU core 71 and the outside (for example, the ASIC 521) and a CPU-I$^2$C controller 76 that controls the transmission and reception of data between the CPU core 71 and the main memory 512 (the CPU-MRAM module 61 and the CPU-DRAM module 62). The CPU 511 further includes a CPU internal bus 77 that connects the CPU core 71, the CPU-RAM controller 72, the CPU/PCIe interface 75, and the CPU-I$^2$C controller 76 in the CPU 511.

The CPU-RAM bus 513 which is an example of a first bus includes a memory bus 513a connected to the CPU-RAM controller 72 and an I$^2$C bus 513b connected to the CPU-I$^2$C controller 76. The transmission speed of data through the memory bus 513a is higher than that of data through the I$^2$C bus 513b.

Next, the internal structure of the ASIC 521 will be described.

The ASIC 521 includes an ASIC core 81 which is an example of a second execution unit performing various kinds of calculation according to the program, an ASIC-RAM controller 82 that controls the transmission and reception of data between the ASIC core 81 and the main memory 522 (ASIC-MRAM module 91), an ASIC/PCIe interface 85 that controls the transmission and reception of data between the ASIC core 81 and the outside (for example, the CPU 511), and an ASIC-I$^2$C controller 86 that controls the transmission and reception of data between the ASIC core 81 and the main memory 522 (ASIC-MRAM module 91). In addition, the ASIC 521 includes an ASIC internal bus 87 that connects the ASIC core 81, the ASIC-RAM controller 82, the ASIC/PCIe interface 85, and the ASIC-I$^2$C controller 86 in the ASIC 521.

The ASIC-RAM bus 523 which is an example of a second bus includes a memory bus 523a connected to the ASIC-RAM controller 82 and an I$^2$C bus 523b connected to the ASIC-I$^2$C controller 86. The transmission speed of data through the memory bus 523a is higher than that of data through the I$^2$C bus 523b.

Figure 4A:
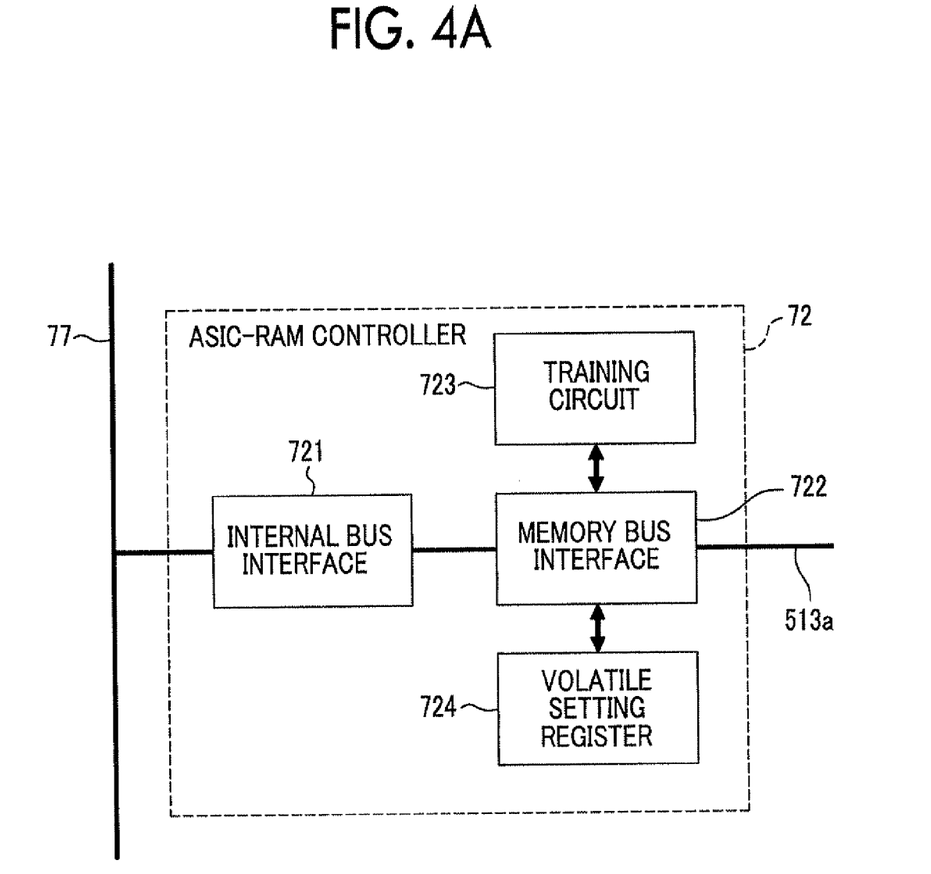
FIG. 4A is a block diagram illustrating an example of the internal structure of a CPU-RAM controller provided in the CPU.
Figure 4B:
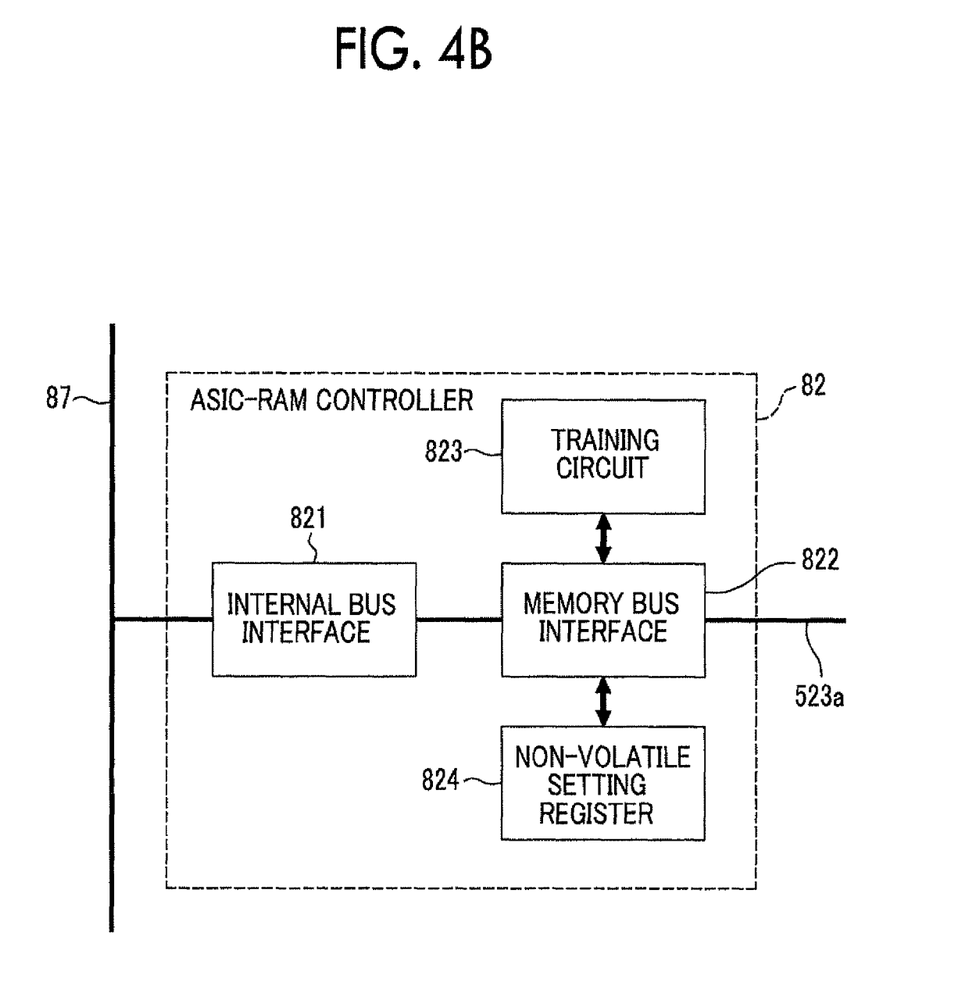
FIG. 4B is a block diagram illustrating an example of the internal structure of an ASIC-RAM controller provided in the ASIC.

FIG. 4A is a block diagram illustrating the internal structure of the CPU-RAM controller 72 provided in the CPU 511 shown in FIG. 3 and FIG. 4S is a block diagram illustrating the internal structure of the ASIC-RAM controller 82 provided in the ASIC 521 shown in FIG. 3.

As shown in FIG. 4A, the CPU-RAM controller 72 which is an example of a first transmission and reception controller includes an internal bus interface 721 that controls the transmission and reception of data to and from the CPU internal bus 77 and a memory bus interface 722 that is connected to the internal bus interface 721 and controls the transmission and reception of data to and from the memory bus 513a. In addition, the CPU-RAM controller 72 includes a training circuit 723 that performs a training sequence for optimizing the transmission and reception conditions of data when the CPU-RAM controller 72 and the main memory 512 (see FIG. 2) are connected to each other through the memory bus 513a and a volatile setting register 724 that stores various set values (hereinafter, referred to as register set values: corresponding to a first setting condition) which are obtained on the basis of the result of the training sequence by the training circuit 723 and are set to the memory bus interface 722.

As shown in FIG. 4B, the ASIC-RAM controller 82 which is an example of a second transmission and reception controller includes an internal bus interface 821 that controls the transmission and reception of data to and from the ASIC internal bus 87 and a memory bus interface 822 that is connected to the internal bus interface 821 and controls the transmission and reception of data to and from the memory bus 523a. In addition, the ASIC-RAM controller 82 includes a training circuit 823 that performs a training sequence for optimizing the transmission and reception conditions of data when the ASIC-RAM controller 82 and the main memory 522 (see FIG. 2) are connected to each other through the memory bus 523a and a non-volatile setting register 824 that stores various set values (hereinafter, referred to as register set values: corresponding to a second setting condition) which are obtained on the basis of the result of the training sequence by the training circuit 823 and are set to the memory bus interface 822.

As such, in this exemplary embodiment, the CPU-RAM controller 72 and the ASIC-RAM controller 82 have substantially the same structure except that the CPU-RAM controller 72 includes the volatile setting register 724 and the ASIC-RAM controller 82 includes the non-volatile setting register 824.

The volatile setting register 724 provided in the CPU-RAM controller 72 is a Static Random Access Memory (SRAM) and functions as a volatile memory that is not capable of retaining stored information when no power is supplied. The non-volatile setting register 824 provided in the ASIC-RAM controller 82 is the same MRAM as the ASIC-MRAM module 91 (see FIG. 3) and functions as a non-volatile memory that is capable of retaining stored information even when no power is supplied.

Figure 5A:
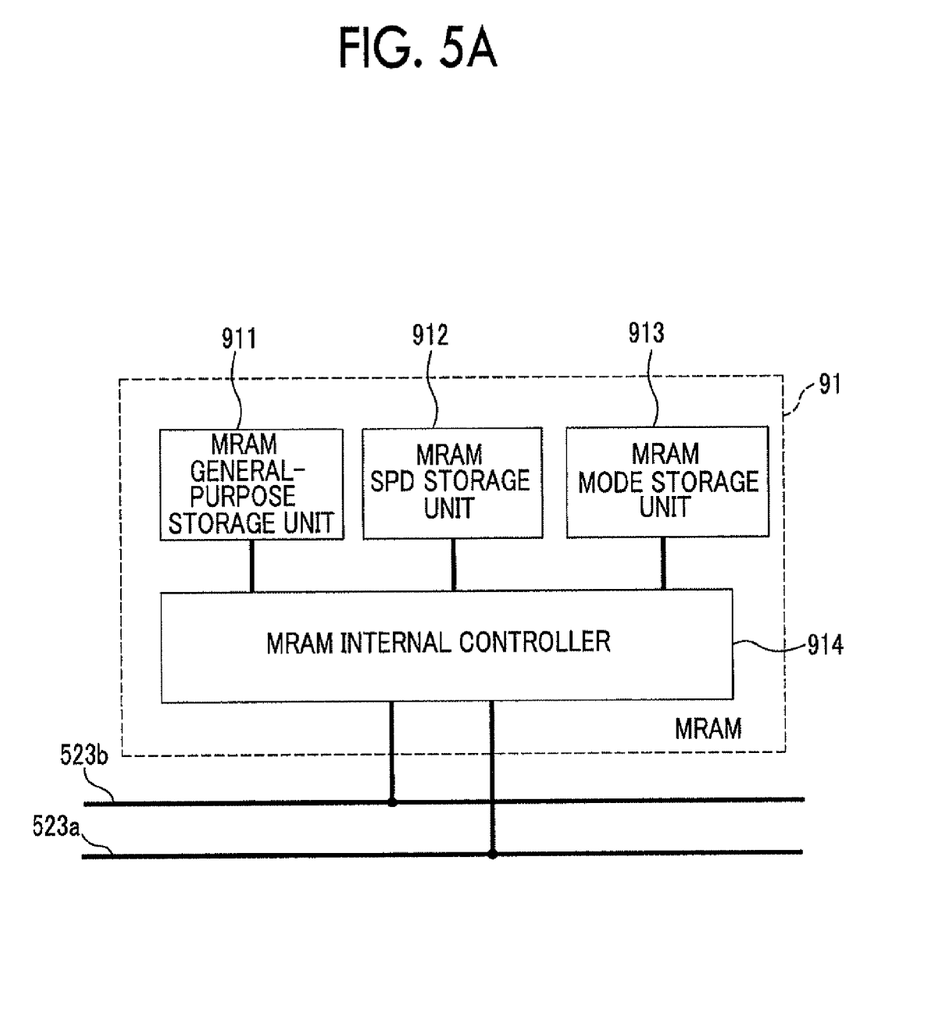
FIG. 5A is a block diagram illustrating an example of the structure of an ASIC-MRAM module provided in an image processing unit.
Figure 5B:
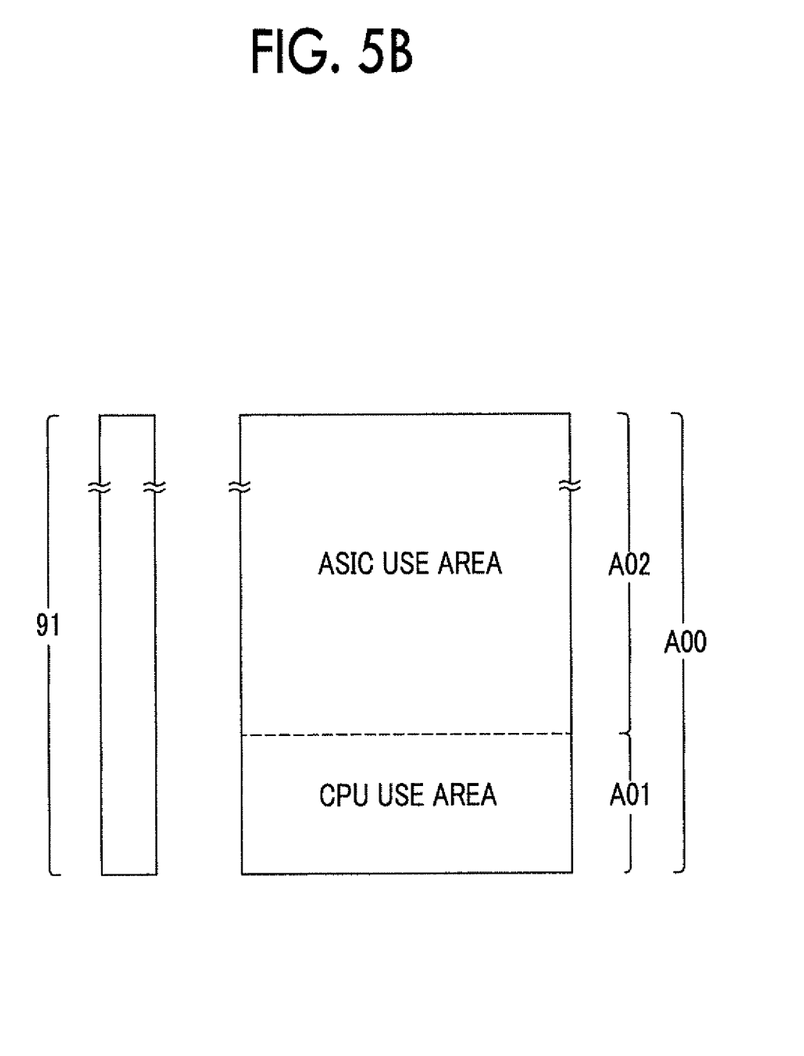
FIG. 5B is a diagram illustrating an example of the memory arrangement of the ASIC-MRAM module.

FIG. 5A is a block diagram illustrating an example of the structure of the ASIC-MRAM module 91 provided in the image processing unit 52 shown in FIG. 2 and FIG. 5B is a diagram illustrating an example of the memory arrangement of the ASIC-MRAM module 91.

First, the internal structure of the ASIC-MRAM module 91 will be described with reference to FIG. 5A.

The ASIC-MRAM module 91 includes an MRAM general-purpose storage unit 911 that stores, for example, the program executed by the ASIC 521 or work data generated when the program is executed and the program executed by the CPU 511, an MRAMSPD storage unit 912 that stores Serial Presence Detect (SPD) including the characteristic information (for example, the maximum available clock frequency or signal timing) of the ASIC-MRAM module 91, and an MRAM mode storage unit 913 that stores the operation mode of the ASIC-MRAM module 91. In addition, the ASIC-MRAM module 91 includes an MRAM internal controller 914 that performs data communication with the ASIC-RAM controller 82 (see FIG. 3) through the memory bus 523a, performs data communication with the ASIC-I²C controller 86 (see FIG. 3) through the I²C bus 523b, and controls the reading and writing of data from and to the MRAM general-purpose storage unit 911, the MRAMSPD storage unit 912, and the MRAM mode storage unit 913.

The MRAM internal controller 914 controls the transmission and reception of data between the memory bus 523a and the MRAM general-purpose storage unit 911 and controls the transmission and reception of data between the I²C bus 523b and the MRAMSPD storage unit 912 and between the I²C bus 523b and the MRAM mode storage unit 913.

In this example, each of the MRAM general-purpose storage unit 911, the MRAMSPD storage unit 912, and the MRAM mode storage unit 913 is an MRAM. However, the invention is not limited thereto. For example, the MRAM general-purpose storage unit 911 may be an MRAM and the MRAMSPD storage unit 912 and the MRAM mode storage unit 913 may be EEPROMs, considering the difference between the transmission speeds of the memory bus 523a and the I²C bus 523b.

The CPU-MRAM module 61 (see FIG. 3) provided in the operation control unit 51 has the same structure as the ASIC-MRAM module 91. The CPU-DRAM module 62 provided in the operation control unit 51 has the same basic structure as the ASIC-MRAM module 91 except that the general-purpose storage unit is not an MRAM, but is a DRAM.

Next, the memory arrangement of the ASIC-MRAM module 91 will be described with reference to FIG. 5B.

In this exemplary embodiment, a storage area A00 which is the entire area (MRAM general-purpose storage unit 911) of the ASIC-MRAM module 91 provided in the image processing unit 52 includes a CPU used area A01 that is used by the CPU 511 provided in the operation control unit 51 and an ASIC used area A02 (corresponding to a second data storage area) that is used by the ASIC 521 provided in the image processing unit 52. The CPU used area A01 is directly accessible by the CPU 511, but is not directly accessible by the ASIC 521. The ASIC used area A02 is directly accessible by the ASIC 521, but is not directly accessible by the CPU 511.

Figure 6:
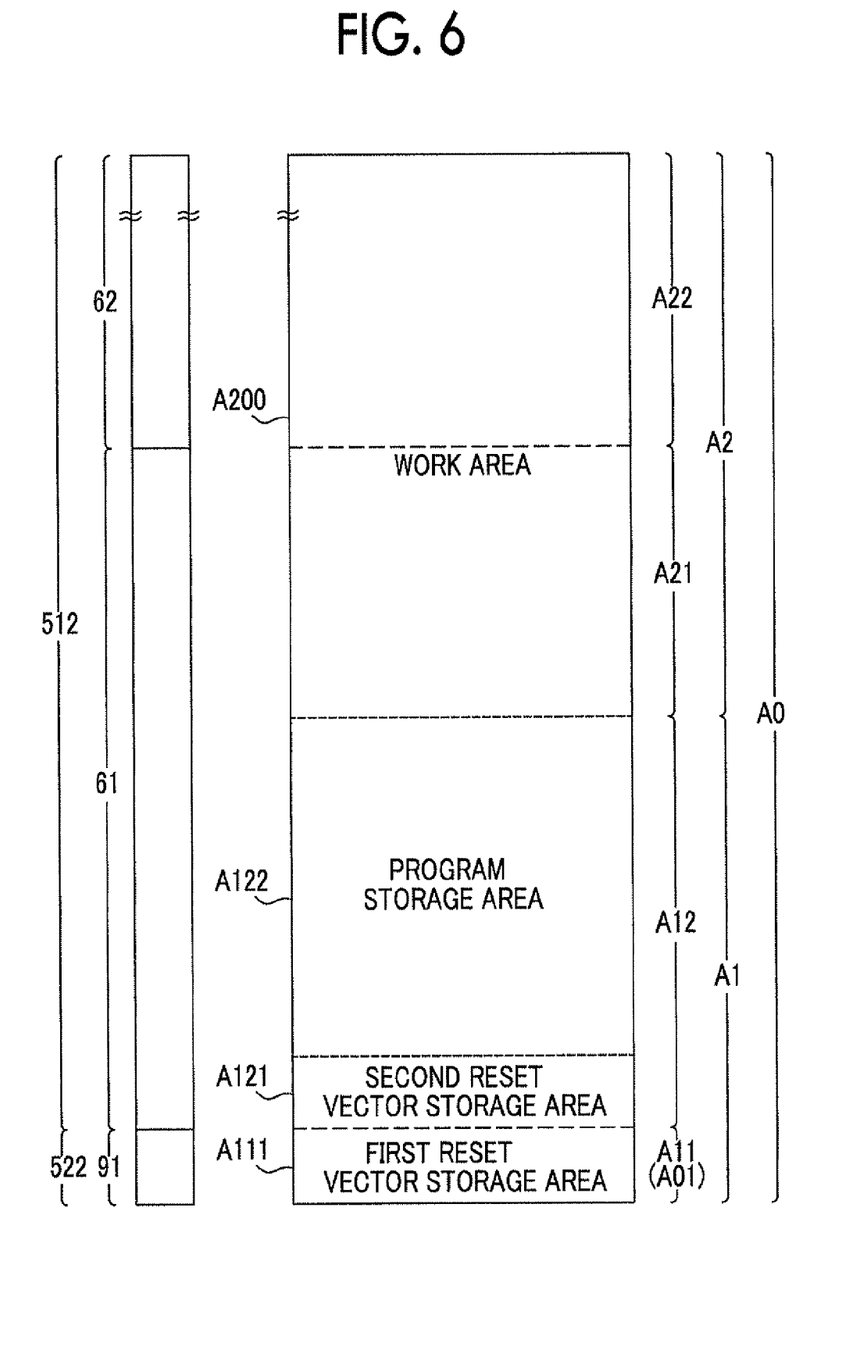
FIG. 6 is a diagram illustrating an example of the structure of a memory map which is accessible by the CPU.

FIG. 6 is a diagram illustrating an example of the structure of a memory map which is accessible by the CPU 511 according to this exemplary embodiment. The CPU 511 provided in the operation control unit 51 reads and writes data from and to the main memory 512 on the basis of the memory map.

In the memory map shown in FIG. 6, the entire storage area A0 includes a ROM area A1 that is basically used as a ROM and a RAM area A2 that is basically used as a RAM. In this exemplary embodiment, the ROM area A1 is arranged across the ASIC-MRAM module 91 and the CPU-MRAM module 61 and the RAM area A2 is arranged across the CPU-MRAM module 61 and the CPU-DRAM module 62. Of them, the ROM area A1 includes a first ROM area A11 which is arranged in the CPU used area A01 of the ASIC-MRAM module 91 and a second ROM area A12 which is arranged in the CPU-MRAM module 61. The RAM area A2 includes a first RAM area A21 which is arranged in the CPU-MRAM module 61 and a second RAM area A22 which is arranged in the CPU-DRAM module 62.

The first ROM area A11 forming the ROM area A1 includes a first reset vector storage area A111. The first reset vector storage area A111 stores a first Initial Program Loader (IPL), which is a program executed by the CPU 511 (see FIG. 2) of the operation control unit 51 when the image forming apparatus 1 starts up.

The second ROM area A12 which forms the ROM area A1 together with the first ROM area A11 includes a second reset vector storage area A121 and a program storage area A122. Of them, the second reset vector storage area A121 stores a second IPL, which is a program executed by the CPU 511 of the operation control unit 51 when the image forming apparatus 1 starts up. In addition, the program storage area A122 which is an example of a program storage area stores a program file executed by the CPU 511 after the start process is completed.

In this exemplary embodiment, the first IPL (corresponding to a second start program) is stored in the first reset vector storage area A111 (corresponding to a second start program storage area) arranged in the ASIC-MRAM module 91 of the image processing unit 52, and the second IPL (corresponding to a first start program) is stored in the second reset vector storage area A121 (corresponding to a first start program storage area) arranged in the CPU-MRAM module 61 of the operation control unit 51.

In this exemplary embodiment, after the CPU 511 is reset in order to start the image forming apparatus 1, any one of the first IPL and the second IPL is selectively executed.

In this example, the first RAM area A21 and the second RAM area A22 forming the RAM area A2 are used as a work area A200 which is an example of a first data storage area and temporarily stores data generated when the CPU 511 executes the program or data for instructions which are output to each component of the image forming apparatus 1 when the CPU 511 performs a process. As such, in this exemplary embodiment, the RAM area A2 (work area A200) is formed by two memories (a portion of the CPU-MRAM module 61 and the entire CPU-DRAM module 62) with different storage systems. The CPU 511 treats the first RAM area A21 arranged in the CPU-MRAM module 61 and the second RAM area A22 arranged in the CPU-DRAM module 62 as the RAM area A2.

Figure 7:
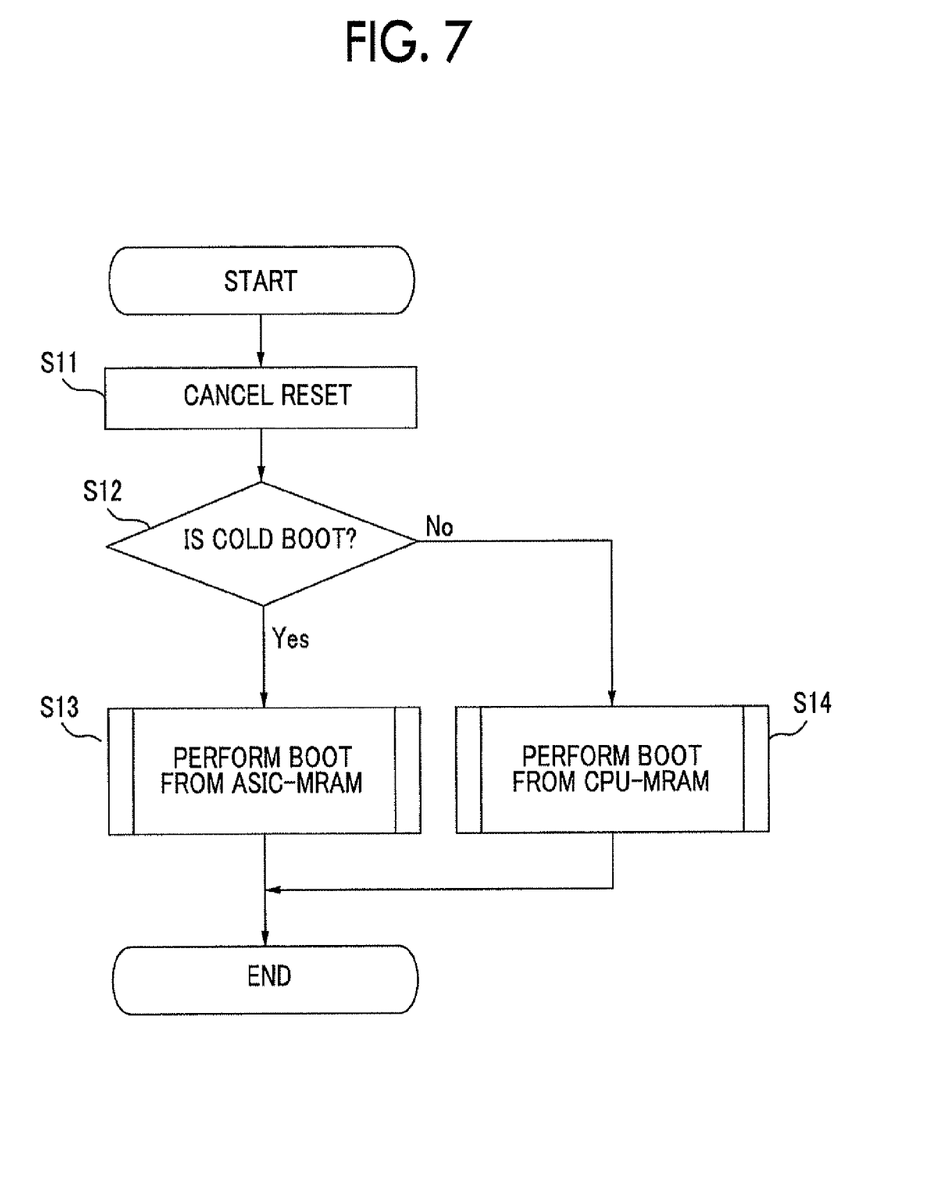
FIG. 7 is a flowchart illustrating a start process of the image forming apparatus.

FIG. 7 is a flowchart illustrating a process of starting the image forming apparatus 1 shown in, for example, FIG. 1. For example, the start process is performed when a reset instruction is input to the control unit 50 (specifically, the CPU 511 of the operation control unit 51). The reset instructions include a reset instruction that involves turning off power and a reset instruction that does not involve turning off power. In the former case, when the reset instruction (for example, hardware reset) that involves turning off power is received, the start process is performed by a so-called cold boot. When the reset instruction (for example, software reset) that does not involve turning off power is received, the start process is performed by a so-called warm boot. In addition, for example, the former cold boot is performed when power is supplied to the image forming apparatus 1 through the UI 30. For example, the latter warm boot is performed when the image forming apparatus 1 is set to a power saving state (power saving mode) and is then instructed to return to a normal state (from the power saving mode to the normal mode).

The CPU 511 provided in the operation control unit 51 of the control unit 50 is reset when the start process starts and then the reset is released (Step 11). When the reset is released, it is determined whether the current start process is the cold boot that involves turning off power (Step 12).

When the determination result in Step 12 is "Yes", that is, when the current start process is the cold boot, the CPU 511 performs a boot (hereinafter, referred to as an "ASIC-MRAM boot" corresponding to a second start process) based on the first IPL which is read from the first reset vector storage area A111 of the first ROM area A11 arranged in the ASIC-MRAM module 91 (Step 13).

When the determination result in Step 12 is "No", that is, when the current start process is not the cold boot, but is the warm boot, the CPU 511 performs a boot (hereinafter, referred to as a "CPU-MRAM boot" corresponding to a first start process) based on the second IPL which is read from the second reset vector storage area A121 of the second ROM area A12 arranged in the CPU-MRAM module 61 (Step 14).

As such, in this exemplary embodiment, after the reset for the CPU 511 is released, a boot selection process of changing the IPL used in the start process is performed according to the state of the power supply before and after the reset.

Figure 8:
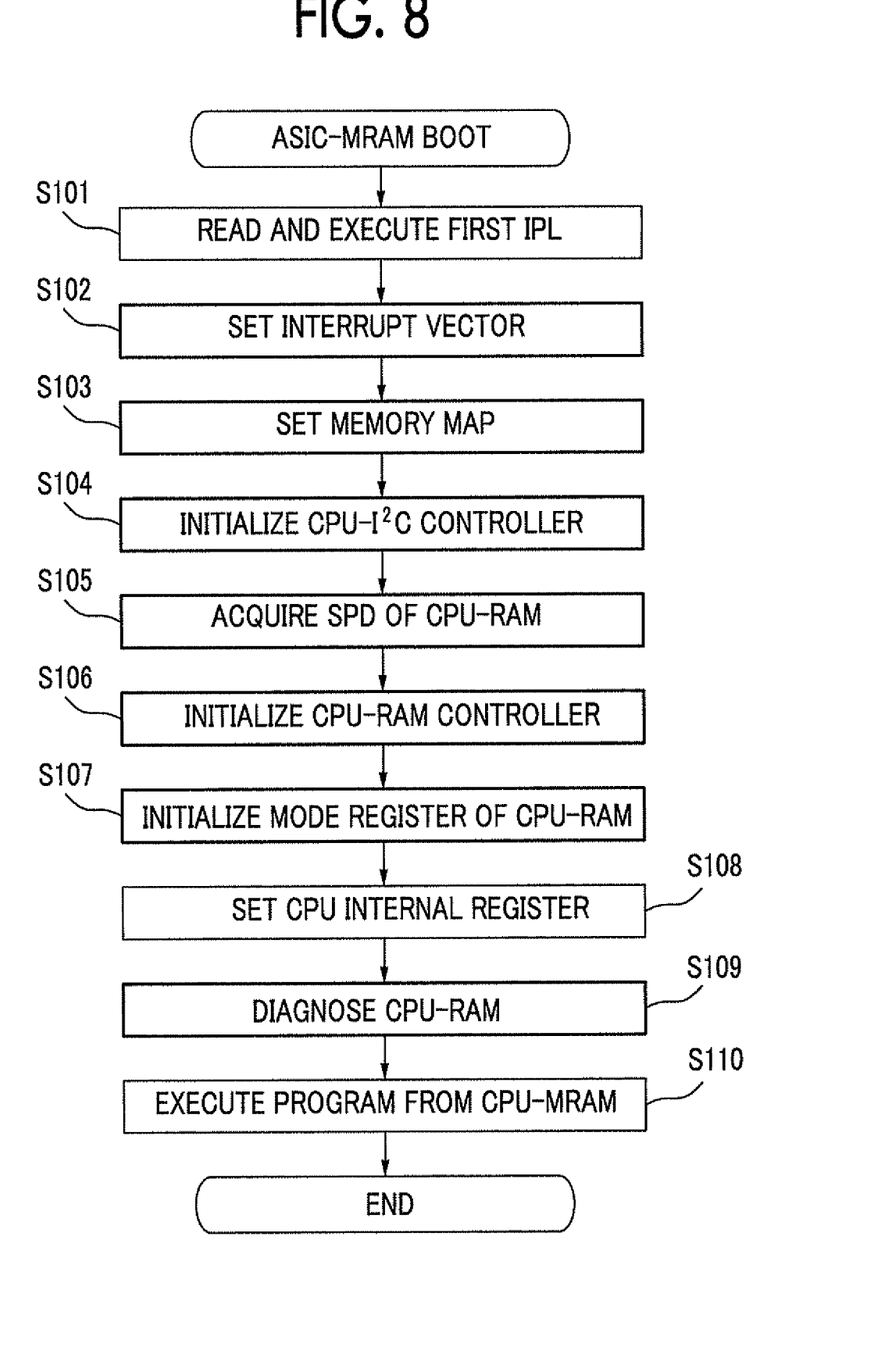
FIG. 8 is a flowchart illustrating the procedure of the start process during an ASIC-MRAM boot.

FIG. 8 is a flowchart illustrating the procedure of the start process during the ASIC-MRAM boot in Step 13 of FIG. 7.

When the ASIC-MRAM boot is selected, power is turned off before and after the reset and the register set values stored until the previous start process are deleted in the volatile setting register 724 of the CPU-RAM controller 72. Therefore, in the initial state of the ASIC-MRAM boot, after the reset is released, it is difficult for the CPU-RAM controller 72 provided in the CPU 511 to directly access the main memory 512 (the CPU-MRAM module 61 and the CPU-DRAM module 62).

When the ASIC-MRAM boot is selected, communication between the CPU 511 and the ASIC 521 through the PCIe bus 53 is available even when power is turned off before and after the reset. In this case, the register set values stored until the previous start process remain in the non-volatile setting register 824 of the ASIC-RAM controller 82, without being deleted. Therefore, in the initial state of the ASIC-MRAM boot, after the reset is released, the CPU 511 may directly access the main memory 522 (the CPU used area A01 provided in the ASIC-MRAM module 91) connected to the ASIC 521.

In the ASIC-MRAM boot, first, the CPU core 71 reads the first IPL from the first reset vector storage area A111 of the first ROM area A11 arranged in the ASIC-MRAM module 91 through the CPU internal bus 77, the CPU/PCIe interface 75, the PCIe bus 53, the ASIC internal bus 87, and the ASIC-RAM controller 82 and executes the first IPL (Step 101). Then, an interrupt vector is set (Step 102) and the memory map shown in FIG. 6 is set to the main memory 512 (Step 103).

Then, the CPU-I$^2$C controller 76 is initialized (Step 104). Then, each SPD is acquired from the MRAMSPD storage unit (not shown) provided in the CPU-MRAM module 61 and the DRAMSPD storage unit (not shown) provided in the CPU-DRAM module 62 through the initialized CPU-I$^2$C controller 76 (Step 105).

Then, the CPU-RAM controller 72 is initialized (Step 106). In Step 106, the training circuit 723 performs a training sequence for optimizing the communication conditions of the CPU-RAM controller 72 and the main memory 512 (the CPU-MRAM module 61 and the CPU-DRAM module 62) through the memory bus 513a on the basis of the SPDs acquired in Step 105 and obtains the optimized set value. Then, the result obtained by the training sequence is written as the register set value to the volatile setting register 724.

Then, the MRAM mode storage unit (not shown) provided in the CPU-MRAM module 61 and the DRAM mode storage unit (not shown) provided in the CPU-DRAM module 62 are initialized (Step 107). Then, information about the operation mode which is obtained as the result of the training sequence is stored in each of the MRAM mode storage unit (not shown) provided in the CPU-MRAM module 61 and the DRAM mode storage unit (not shown) provided in the CPU-DRAM module 62.

Then, an internal register (not shown) provided in the CPU core 71 is set (Step 108) and the states of the MRAM general-purpose storage unit (not shown) provided in the CPU-MRAM module 61 and the DRAM general-purpose storage unit (not shown) provided in the CPU-DRAM module 62 are diagnosed (checked) (it is checked whether errors occur in the storage units) (Step 109). In this example, the internal register of the CPU core 71 is a volatile memory.

Then, the CPU core 71 completes the execution of the first IPI, and starts to execute the program read from the program storage area A122 arranged in the CPU-MRAM module 61 (Step 110). Then, for example, the initialization of the CPU/PCIe interface 75, the initialization of the ASIC 521 through the CPU/PCIe interface 75 and the PCIe bus 53, and the initialization of the transmitting and receiving unit 40 are performed to set the image forming apparatus 1 to an available state. In this way, the start process during the ASIC-MRAM boot is completed.

Figure 9:
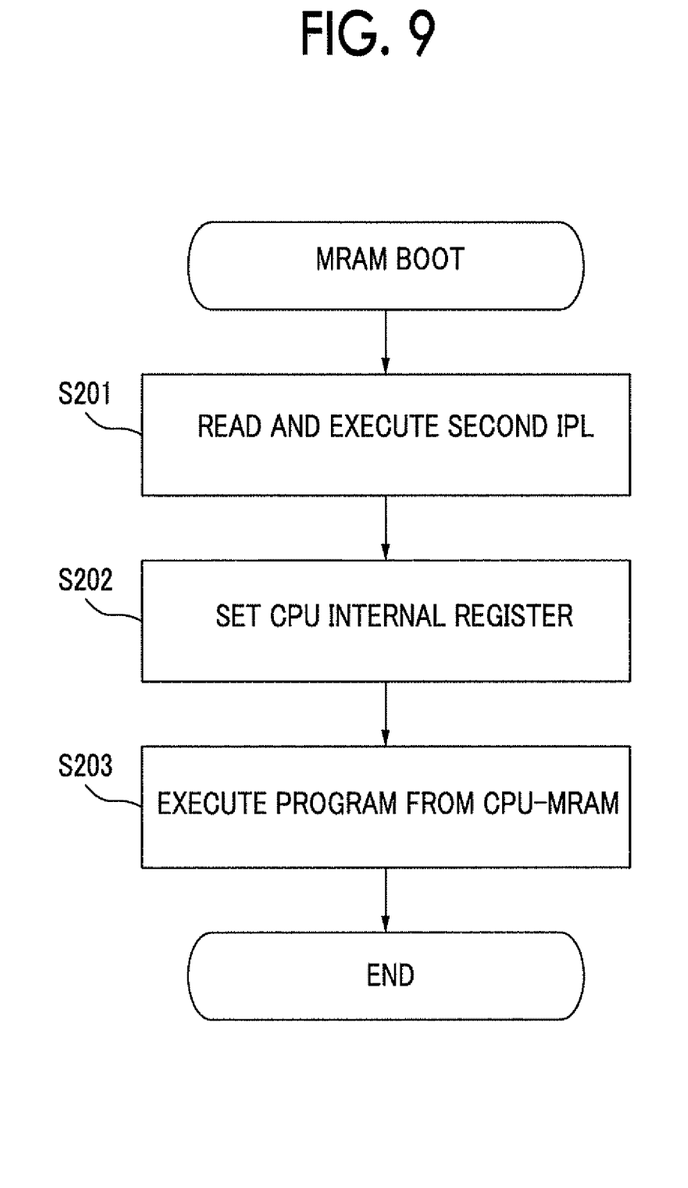
FIG. 9 is a flowchart illustrating the procedure of the start process during a CPU-MRAM boot.

FIG. 9 is a flowchart illustrating the procedure of the start process during the CPU-MRAM boot in Step 14 of FIG. 7.

When the CPU-MRAM boot is selected, power is not turned off before and after reset, and the register set value stored until the previous start process remains in the volatile setting register 724 of the CPU-RAM controller 72, without being deleted. Therefore, in the initial state of the CPU-MRAM boot, unlike the ASIC-MRAM boot, after the reset is released, the CPU-RAM controller 72 provided in the CPU 511 may directly access the main memory 512 (the CPU-MRAM module 61 and the CPU-DRAM module 62).

In the CPU-MRAM boot, first, the CPU core 71 reads the second IPL from the second reset vector storage area A121 of the second ROM area A12 arranged in the CPU-MRAM module 61 through the CPU internal bus 77 and the CPU-RAM controller 72 and executes the second IPL (Step 201). Then, an internal register (not shown) provided in the CPU core 71 is set (Step 202).

Then, the CPU core 71 completes the execution of the second IPL and starts to execute the program read from the program storage area A122 (Step 203). Then, for example, the initialization of the CPU/PCIe interface 75, the initialization of the ASIC 521 through the CPU/PCIe interface and the PCIe bus 53, and the initialization of the transmitting and receiving unit 40 are performed to set the image forming apparatus 1 to an available state. In this way, the start process during the CPU-MRAM boot is completed.

As such, as compared to the ASIC-MRAM boot (see FIG. 8) in Step 13 (see FIG. 7), in the CPU-MRAM boot (see FIG. 9) in Step 14 (see FIG. 7), the start process in which various initial settings are omitted is performed. Therefore, it is possible to reduce the time required for the start process. In the flowchart illustrating the ASIC-MRAM boot in FIG. 8, steps represented by bold frames correspond to steps which are omitted in the CPU-MRAM boot shown in FIG. 9.

In this exemplary embodiment, for example, when power is turned on, content (setting register) stored in the volatile setting register 724 of the CPU-RAM controller 72 provided in the CPU 511 is deleted. Therefore, even when communication between the CPU 511 and the main memory 512 in the operation control unit 51 is unavailable, content (setting register) stored in the non-volatile setting register 824 of the ASIC-RAM controller 82 provided in the ASIC 521 remains and the CPU 511 of the operation control unit 51 communicates with the main memory 522 of the image processing unit 52. In addition, the first IPL is stored in the main memory 522 (specifically, the CPU used area A01 (=the first ROM area A11) provided in the ASIC-MRAM module 91) of the image processing unit 52. In this way, it is possible to perform the start process (ASIC-MRAM boot) of the image forming apparatus 1. When the first IPL is performed, it is possible to perform communication between the CPU 511 and the main memory 512 in the operation control unit 51, and it is possible to read the program from the main memory 512 (specifically, the second ROM area A12 provided in the CPU-MRAM module 61) and execute the program.

In this exemplary embodiment, when content (setting register) stored in the volatile setting register 724 of the CPU-RAM controller 72 provided in the CPU 511 remains during, for example, the return of the mode from the power saving mode, the first IPL is stored in the main memory 512 (specifically, the second ROM area A12 provided in the CPU-MRAM module 61) of the operation control unit 51. In this way, it is possible to perform the start process (CPU-MRAM boot) of the image forming apparatus 1. In this case, for example, the CPU-RAM controller 72 may not be initialized. Therefore, it is possible to reduce the time required for the start process in the CPU-MRAM boot, as compared to the time required for the start process in the ASIC-MRAM boot.

In an embedded system, in general, a commercial product is used in the CPU 511, but a dedicated product with a customized function is used in the ASIC 521. In the general CPU 511, in many cases, a volatile memory is used as the setting register, but a non-volatile memory is rarely used as the setting register. In contrast, since the ASIC 521 is manufactured as a dedicated product, a non-volatile memory is generally used as the setting register.

In this exemplary embodiment, the main memory 512 includes the CPU-MRAM module 61 and the CPU-DRAM module 62, but the invention is not limited thereto. For example, only the CPU-MRAM module 61 may be used to form the main memory 512.

In this exemplary embodiment, the CPU-MRAM module 61 and the ASIC-MRAM module 91 are used as the non-volatile memories in the main memory 512 and the main memory 522, respectively, but the invention is not limited thereto. For example, a FeRAM (Ferroelectric RAM), a PRAM (Phase change RAM), or a ReRAM (Resistance RAM) may be used as the non-volatile memory used in the main memory 512 or the main memory 522.

In this exemplary embodiment, the non-volatile setting register 824 provided in the ASIC-RAM controller 82 is an MRAM, but the invention is not limited thereto. For example, the non-volatile setting register 824 may be an FeRAM, a PRAM, or a ReRAM.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An image forming apparatus comprising:
   an image forming unit that forms an image on a recording material; and
   a controller that controls the image forming unit,
   wherein the controller includes:
   a first execution unit that executes a first program used to control the image forming unit;
   a first main memory that includes a first non-volatile memory which is readable and writable and is capable of retaining stored information even when no power is supplied, is connected to the first execution unit through a first bus, and stores a first start program to be executed upon the start-up of the first execution unit;
   a first transmission and reception controller that is connected to the first bus, controls transmission and reception of data between the first execution unit and the first main memory, and includes a volatile memory which stores a first setting condition set to transmit and receive the data;

a second execution unit that is connected to the first execution unit through a connection bus and executes a second program which is used to process image data to be output to the image forming unit;

a second main memory that includes a second non-volatile memory which is readable and writable and is capable of retaining stored information even when no power is supplied, is connected to the second execution unit through a second bus, and stores a second start program to be executed upon the start-up of the first execution unit; and a second transmission and reception controller that is connected to the second bus, controls transmission and reception of data between the second execution unit and the second main memory, and includes a third non-volatile memory which stores a second setting condition set to transmit and receive the data.

2. The image forming apparatus according to claim 1,
wherein the first execution unit executes the first start program read from the first main memory through the first transmission and reception controller in a first start process which starts while the supply of power to the first transmission and reception controller is maintained, and
the first execution unit executes the second start program read from the second main memory through the second transmission and reception controller in a second start process which starts while the supply of power to the first transmission and reception controller is cut.

3. An information processing apparatus comprising:
a first execution unit that executes a first program;
a first main memory that includes a first non-volatile memory which is readable and writable and is capable of retaining stored information even when no power is supplied, is connected to the first execution unit through a first bus, and stores a first start program to be executed upon the start-up of the first execution unit;
a first transmission and reception controller that is connected to the first bus, controls transmission and reception of data between the first execution unit and the first main memory, and includes a volatile memory which stores a first setting condition set to transmit and receive the data;
a second execution unit that is connected to the first execution unit through a connection bus and executes a second program;
a second main memory that includes a second non-volatile memory which is readable and writable and is capable of retaining stored information even when no power is supplied, is connected to the second execution unit through a second bus, and stores a second start program to be executed upon the start-up of the first execution unit; and
a second transmission and reception controller that is connected to the second bus, controls transmission and reception of data between the second execution unit and the second main memory, and includes a third non-volatile memory which stores a second setting condition set to transmit and receive the data.

4. The information processing apparatus according to claim 3,
wherein the first execution unit executes the first start program read from the first main memory through the first transmission and reception controller in a first start process which starts while the supply of power to the first transmission and reception controller is maintained, and
the first execution unit executes the second start program read from the second main memory through the second transmission and reception controller in a second start process which starts while the supply of power to the first transmission and reception controller is cut.

5. The information processing apparatus according to claim 3,
wherein the first main memory includes a first start program storage area that stores the first start program and a first data storage area that stores data generated when the first execution unit executes the first program, and
the second main memory includes a second start program storage area that stores the second start program and a second data storage area that stores data generated when the second execution unit executes the second program.

6. The information processing apparatus according to claim 4,
wherein the first main memory includes a first start program storage area that stores the first start program and a first data storage area that stores data generated when the first execution unit executes the first program, and
the second main memory includes a second start program storage area that stores the second start program and a second data storage area that stores data generated when the second execution unit executes the second program.

7. The information processing apparatus according to claim 5,
wherein the first main memory further includes a first volatile memory that is readable and writable and is not capable of retaining stored information when no power is supplied, and
the first volatile memory includes the first data storage area.

8. The information processing apparatus according to claim 6,
wherein the first main memory further includes a first volatile memory that is readable and writable and is not capable of retaining stored information when no power is supplied, and
the first volatile memory includes the first data storage area.

9. The information processing apparatus according to claim 3,
wherein the first main memory further includes a program storage area that stores the first program.

10. The information processing apparatus according to claim 4,
wherein the first main memory further includes a program storage area that stores the first program.

11. The information processing apparatus according to claim 5,
wherein the first main memory further includes a program storage area that stores the first program.

12. The information processing apparatus according to claim 6,
wherein the first main memory further includes a program storage area that stores the first program.

13. The information processing apparatus according to claim 7,
wherein the first main memory further includes a program storage area that stores the first program.

14. The information processing apparatus according to claim 8,
wherein the first main memory further includes a program storage area that stores the first program.

15. The information processing apparatus according to claim 3,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

16. The information processing apparatus according to claim 4,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

17. The information processing apparatus according to claim 5,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

18. The information processing apparatus according to claim 6,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

19. The information processing apparatus according to claim 7,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

20. The information processing apparatus according to claim 8,
wherein each of the first non-volatile memory of the first main memory, the second non-volatile memory of the second main memory, and the third non-volatile memory of the second transmission and reception controller is any one of an MRAM, an FeRAM, a PRAM, and a ReRAM.

* * * * *